Oct. 24, 1939.   R. W. WAGNER   2,177,357
MOWING MACHINE
Filed Jan. 3, 1938   4 Sheets-Sheet 1
FIG.I.
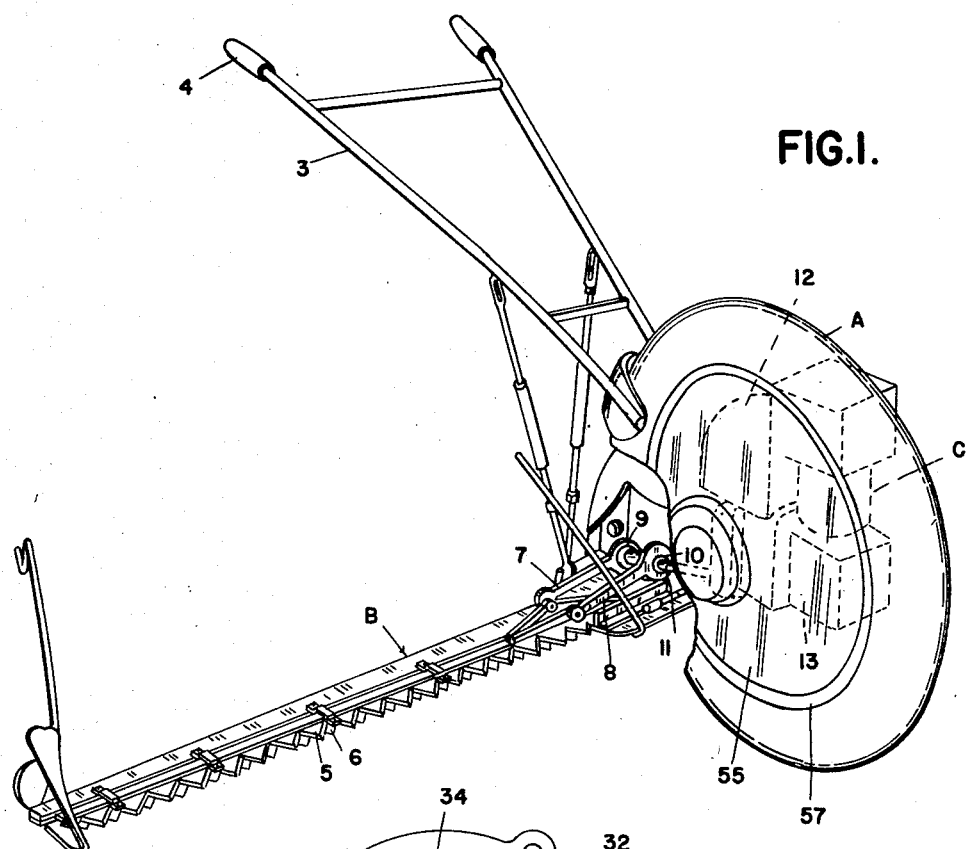
FIG.6.
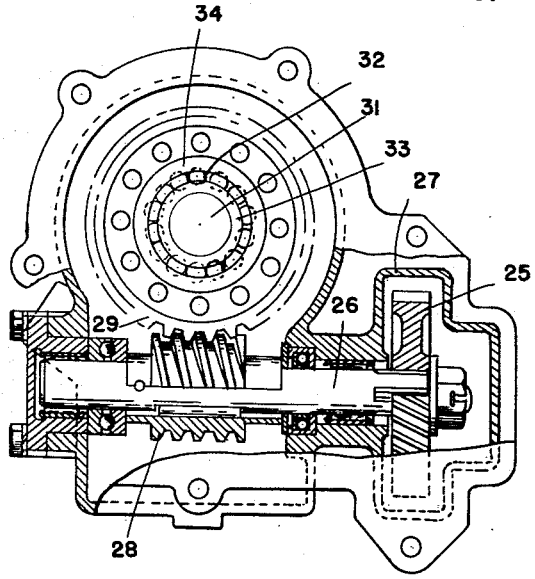
INVENTOR
ROBERT W. WAGNER
BY
ATTORNEYS Oct. 24, 1939.　　　R. W. WAGNER　　　2,177,357
MOWING MACHINE
Filed Jan. 3, 1938　　　4 Sheets-Sheet 2
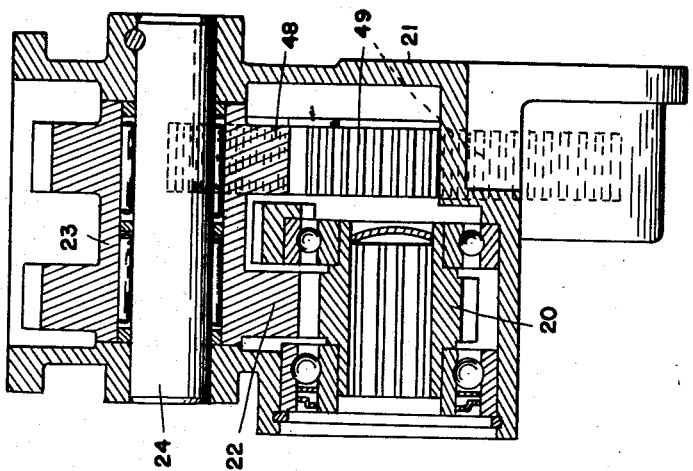
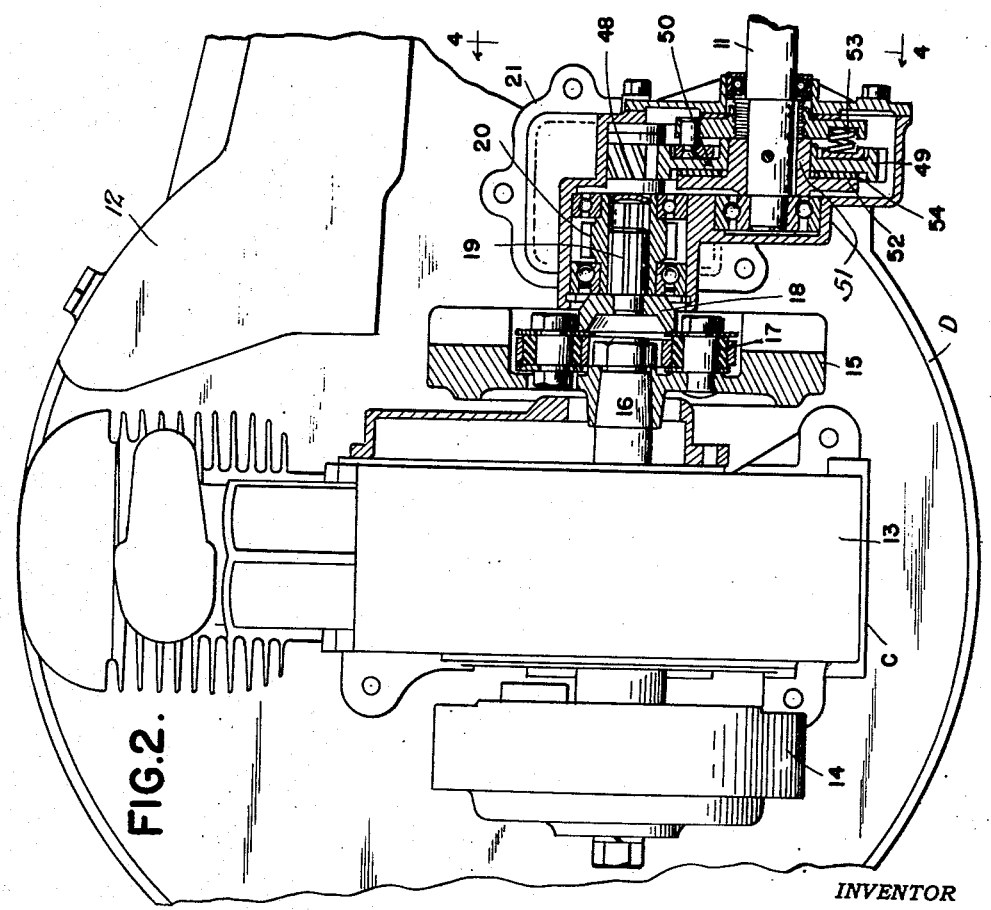
INVENTOR
ROBERT W. WAGNER
BY
ATTORNEYS Oct. 24, 1939.     R. W. WAGNER     2,177,357
MOWING MACHINE
Filed Jan. 3, 1938     4 Sheets-Sheet 3
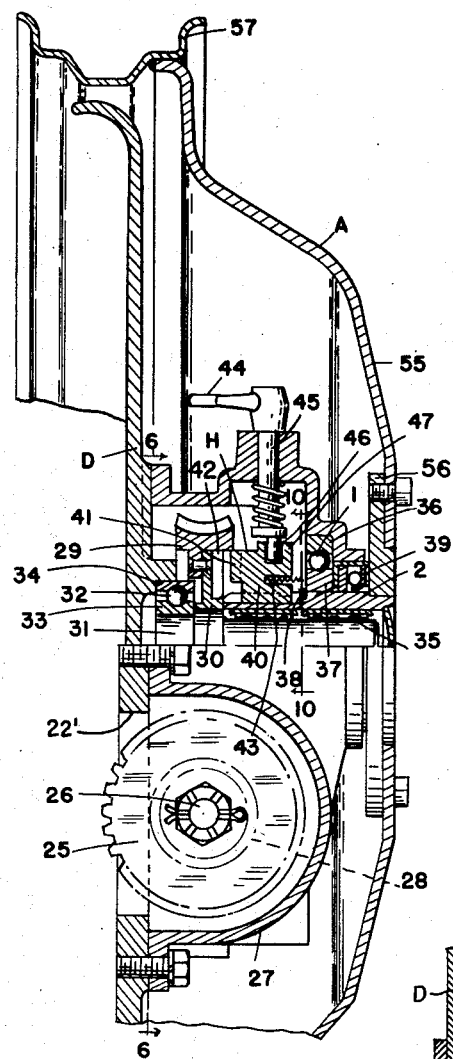
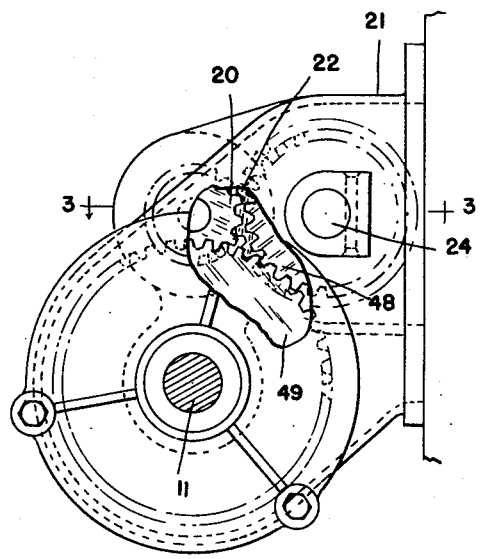
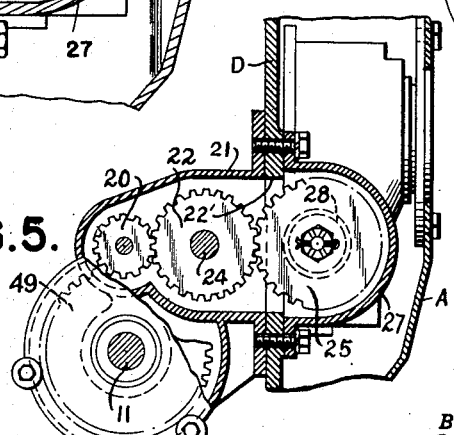
INVENTOR
ROBERT W. WAGNER
BY
ATTORNEYS Oct. 24, 1939.  R. W. WAGNER  2,177,357
MOWING MACHINE
Filed Jan. 3, 1938  4 Sheets-Sheet 4
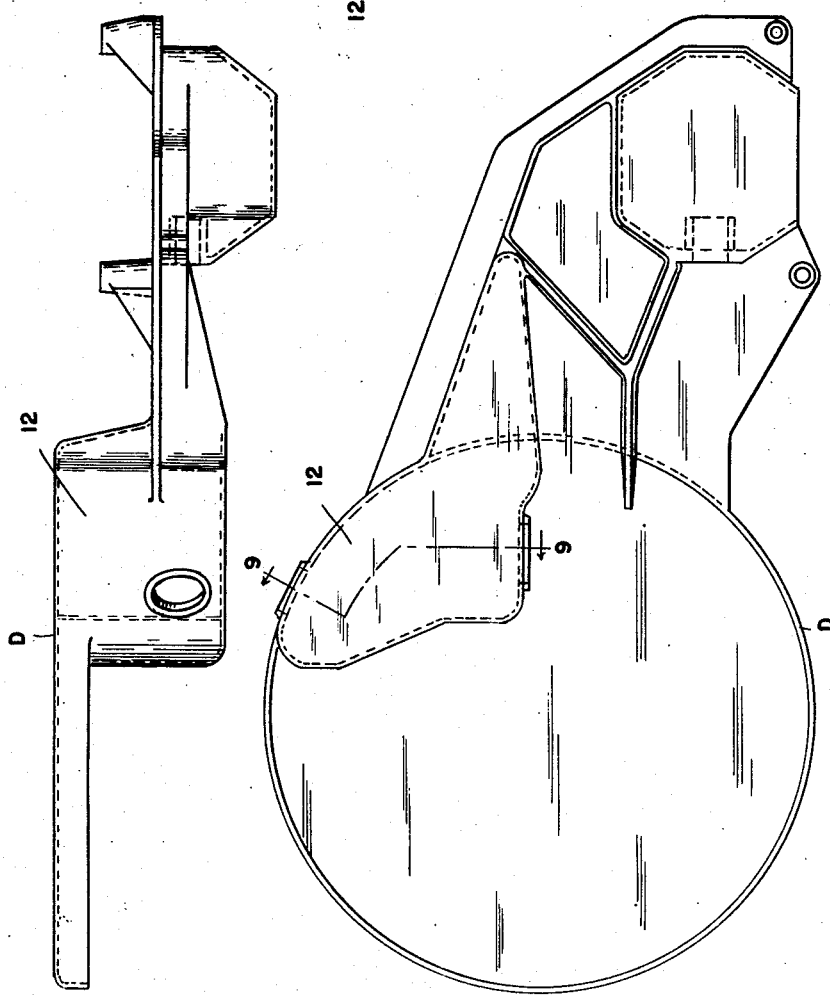
*INVENTOR*
ROBERT W. WAGNER
BY
*ATTORNEYS*

Patented Oct. 24, 1939

2,177,357

UNITED STATES PATENT OFFICE 2,177,357

MOWING MACHINE

Robert W. Wagner, Detroit, Mich., assignor to Detroit Harvester Company, Detroit, Mich., a corporation of Michigan Application January 3, 1938, Serial No. 183,176

12 Claims. (Cl. 56—25)

This invention relates generally to mowing machines and refers more particularly to a motor driven machine supported on a single ground wheel and capable of being guided by the operator through the medium of handlebars.

One of the essential objects of the invention is to provide a machine of this type wherein the ground wheel cooperates with the frame of the machine to form a housing for clutch mechanism and associated parts controlling the driving connection between the wheel and a suitable power plant carried by the frame.

Another object is to provide a machine wherein the hub of the wheel is arranged in telescoping relation with the clutch mechanism carried by the frame to provide a compact assembly.

Another object is to provide a machine wherein the body of the wheel is removable from the hub thereof for repair or other purposes without affecting the driving connection aforesaid.

Another object is to provide a machine wherein the frame comprises a one-piece casting having a portion forming a tank for gasoline constituting the fuel for the motor.

Another object is to provide a machine that comprises relatively few parts and can be manufactured for less than machines of this general type now on the market.

Other objects, advantages and novel details of construction of this invention will be made more apparent as this description proceeds, especially when considered in connection with the accompanying drawings, wherein:

Figure 1 is a perspective view of a mowing machine embodying my invention;

Figure 2 is a fragmentary side elevation of the machine with parts broken away and in section;

Figure 3 is a horizontal sectional view taken on line 3—3 of Figure 4;

Figure 4 is a sectional view on line 4—4 of Figure 2 with parts broken away;

Figure 5 is a fragmentary vertical sectional view through the housing formed by the ground wheel and frame and showing the clutch mechanism and associated parts;

Figure 6 is a sectional view taken substantially on line 6—6 of Figure 5;

Figure 7 is a side elevation of the one-piece frame;

Figure 8 is a top plan view of the frame;

Figure 9 is a sectional view taken substantially on line 9—9 of Figure 7;

Figure 10 is a sectional view taken on line 10—10 of Figure 5;

Figure 11 is a fragmentary rear elevation with parts broken away showing the relationship between the motor and the driving transmission.

Referring now to the drawings, A is the ground wheel, B is the mowing mechanism, and C is the power plant for both the wheel A and mowing mechanism B of a machine embodying my invention.

D is a frame carrying bearings 1 for the hub 2 of the ground wheel and serving as a common support for the mowing mechanism B and power plant C. To facilitate guiding the machine, the frame D is provided with handle-bars 3 that extend rearward therefrom and have suitable grips or handles 4 at their rear ends.

The mowing mechanism B preferably comprises a pair of cooperating cutter bars 5 and 6 operable by pitman rods 7 and 8 from suitab'e cams 9 and 10 on a shaft 11 driven by the power plant C, as in my copending application filed January 3, 1938, bearing Serial No. 183,175.

The power plant C is bolted to the frame D and preferably comprises an internal combustion engine which is fed with gasoline from a tank 12 constituting a part of the frame D. As shown, the engine C is conventional in design and has a suitable crank case 13, magneto 14, and flywheel 15. Preferably the flywheel 15 is fixed to the engine drive shaft 16 and carries a resilient mounting 17 for a spider 18 carrying an axle extension 19 of the shaft 16. 20 is a gear journaled in suitable bearings in a housing 21 on the frame and splined upon the extension 19 of the engine drive shaft. 22 is a gear meshing with gear 20 and having a hub 23 journaled on a stub shaft 24 in the housing 21.

For driving the ground wheel A, I have provided a gear 25 that meshes with gear 22 and is splined upon shaft 26 journaled in another housing 27 carried by the frame D. Fixed upon this shaft 26 is a worm 28 meshing with a gear 29 having a hub 30 on a shaft 31 extending axially of the hub 2 of the ground wheel. Ball bearings 32 are provided between races 33 and 34 respectively carried by the shaft 31 and housing 27, while needle bearings 35 are provided between the shaft 31 and wheel hub 2. The bearings 1 for the wheel hub 2 are similar to the ball bearings 32 and are disposed between races 36 and 37 respectively carried by the hub 2 and housing 27. 38 is a lock ring for the wheel hub 2, and 39 is an oil seal for the wheel hub.

For driving the wheel A from the gear 29, I have provided a clutch H comprising a collar 40 splined upon the wheel hub 2 and having laterally projecting teeth 41 for clutching engagement with suitable recesses 42 in the adjacent side of the gear hub 30. Coil springs 43 tend to move the collar 40 into clutching engagement with the gear 29, while a throw-out lever 44 is used to disengage the parts. As shown, this lever 44 has a pivot 45 journaled in the housing 27 and provided at its lower end with an eccentric pin 46 that engages a circumferentially extending groove or channel 47 in the collar 40.

For driving the mower mechanism B, I have provided a gear 48 integral with the hub 23 of the gear 22 and meshing with a gear 49 connected by a friction clutch 50 to the pitman cam carrying shaft 11. As shown, gear 49 is sleeved on the hub 51 of a disc 52 fixed to shaft 11 and is held by coil springs 53 against a clutch lining 54 on the adjacent face of the disc 52.

Thus, with the construction as described, the drive from the power plant C to the cutter bars 5 and 6 of the mowing mechanism B is constant while the engine is running. Normally, the clutch teeth 41 of the collar 40 are out of engagement with the recesses 42 in the gear hub 30, hence the gear 42 and shaft 31 revolve freely without actuating the ground wheel A. However, when it is desired to drive the machine over the ground, the lever 44 is actuated so as to permit the clutch teeth 41 to engage the recesses 42 and thus establish a driving connection between the gear 29 and ground wheel A. The wheel hub 2, shaft 31, collar 40 and gear 29 will then turn in unison.

By referring to Figure 5, it will be noted that the disc 55 of the wheel is bolted upon the outer side of an attaching plate 56 fixed to the hub 2, hence the disc 55 and rim 57 can be removed at will for repairs or other purposes without affecting the driving connection aforesaid. It should also be noted that the disc 55 and rim 57 cooperate with the frame D to form a housing for the clutch H and associated parts, including the gear 29 and shaft 31, as well as for the bearings 1, 32 and 35, respectively, and the gear 25, shaft 26 and worm 28 constituting a portion of the drive mechanism for said clutch. Thus, these parts are effectively shielded from dust, dirt, etc.

As best shown in Figs. 1 and 2, the motor C is detachably secured to one side of the frame D. The motor C, as best shown in Figs. 2 and 3, is adapted to rotate a gear 22. The frame D is provided with an aperture 22' (Fig. 11) and the gear 22 is journalled for rotation in housing 21 adjacent the aperture.

On the opposite side of the frame D transmission means are provided for rotating the wheel A relative to the frame D. As best seen in Figs. 5 and 6 this transmission includes a gear 25 which is adapted to rotate a worm 28, the latter being in driving relation with a worm gear 29. The gear 25 is journalled within a housing 27 and is positioned as best seen in Fig. 11 for meshing engagement with gear 22 through the aperture 22'.

This arrangement provides for ready removal of the motor assembly or of the wheel and transmission assembly each independently of the other. The transmission between the motor and the ground wheel thus includes a pair of gears journalled on opposite sides of the frame D and adapted to mesh through an aperture therein.

By referring to Figures 7, 8 and 9, it will be noted that the frame D including the gasoline tank 12 is a one-piece casting, thus the over-all number of parts has been materially reduced, assembly operations have been dispensed with, and the over-all cost of manufacturing such machines has accordingly been reduced.

What I claim as my invention is:

1. A ground wheel structure for a mowing machine having mowing mechanism, and a power plant for said mechanism, comprising a ground wheel, and a casting carried by said wheel and constituting a common support for said mechanism and power plant, a portion of said casting being hollow and forming a fuel tank for the power plant.

2. In a device of the character set forth, an apertured plate, a power assembly detachably secured to one side of said plate, a wheel rotatably and detachably secured to the opposite side of said plate, transmission means interconnecting said power assembly and wheel and including a pair of gears journalled on opposite sides of said plate and positioned to mesh through said aperture, said plate and wheel cooperating with each other to form a substantially closed housing for a portion of said transmission means.

3. In a device of the character set forth, an apertured plate, a power assembly detachably secured to one side of said plate, a wheel rotatably and detachably secured to the opposite side of said plate, transmission means interconnecting said power assembly and wheel and including a pair of gears journalled on opposite sides of said plate and positioned to mesh through said aperture, said plate and wheel cooperating with each other to form a substantially closed housing for a portion of said transmission means, said transmission means additionally including a clutch, said clutch being received within said housing.

4. A frame for a motor wheel assembly comprising a disk portion adapted to support a motor and wheel on opposite sides thereof, said disk portion being apertured to provide for transmission means interconnecting said motor and wheel, and a fuel tank formed integrally with said disk portion.

5. A motor wheel comprising a disk, a support located centrally of said disk, a dished wheel removably and rotatably mounted on said support, the periphery of said wheel being closely adjacent to the periphery of said disk to provide a housing, a motor mounted directly on said disk, transmission means between said motor and wheel, at least a portion of said transmission means being located in said housing.

6. A ground wheel structure for a mowing machine having mowing mechanism, and a power plant for said mechanism; comprising a ground wheel, a common support for the mowing mechanism and power plant carried by said wheel, housings upon opposite sides of said support, the portion of said support between said housings having an opening, and a driving connection between said power plant and wheel including power transmission means in said housings and intermediate opening.

7. A ground wheel structure for a mowing machine having mowing mechanism, and a power plant for said mechanism; comprising a ground wheel, a common support for the mowing mechanism and power plant carried by said wheel, said support having an opening therethrough, said ground wheel having a disk and a rim cooperating with said support to form a substantially closed housing, and a driving connection between said power plant and wheel including power transmission means in said opening and housing.

8. A ground wheel structure for a mowing machine having mowing mechanism and a power plant for said mechanism, comprising a ground wheel having a disk-like body and a rim, a support for the mowing mechanism and power plant within the rim beside the disk-like body and cooperating with said rim and body to form a substantially closed housing, and means for driving said ground wheel from said power plant including power transmitting means located within said housing.

9. A ground wheel structure for a mowing machine having a power plant, comprising a ground wheel, having a hub, a disk-like body and a rim, a support for the power plant within the rim beside the disk-like body and cooperating with said rim and body to form a substantially closed housing, and means for driving said ground wheel from said power plant including clutch mechanism carried by said support in substantially concentric relation to the hub of said wheel.

10. A ground wheel structure for a mowing machine having a power plant, comprising a ground wheel having a hub, a disk-like body, and a rim, a support for the power plant adjacent said hub and cooperating with said rim and disk-like body to form a substantially closed housing, and means for driving the wheel from the power plant including mechanism within the housing substantially concentric with the hub of said wheel.

11. A ground wheel structure for a mowing machine having a power plant, comprising a ground wheel having a hub, a disk-like body, and a rim, a support for the power plant adjacent the hub and cooperating with said rim and disk-like body to form a substantially closed housing, and means for driving said wheel from said power plant including clutch mechanism within said housing, the disk-like body of said wheel being removable from the hub without affecting the clutch mechanism.

12. A ground wheel structure for a mowing machine having mowing mechanism and a power plant for said mechanism, comprising a ground wheel having a disk-like body and a rim, a common support for said mechanism and power plant substantially concentric with the rim and cooperating with said rim and disk-like body to form a substantially closed housing, means operable by the power plant for constantly driving the mowing mechanism, and means operable by a portion of the means just mentioned and including clutch mechanism within the housing aforesaid for driving the ground wheel, said clutch mechanism being operable to render the drive means for the wheel inoperative.

ROBERT W. WAGNER.